US005858267A

United States Patent [19]

Hirano et al.

[11] Patent Number: 5,858,267

[45] Date of Patent: Jan. 12, 1999

[54] METHOD FOR TREATING CHLORINATED ORGANIC COMPOUND

[75] Inventors: Keiji Hirano; Noriyuki Nakayama, both of Tokyo, Japan

[73] Assignee: NEC Corporation, Tokyo, Japan

[21] Appl. No.: 948,611

[22] Filed: Oct. 10, 1997

[30] Foreign Application Priority Data

Oct. 11, 1996 [JP] Japan .................................... 8-270047

[51] Int. Cl.[6] ............................ B01D 19/00; A62D 3/00; C02F 1/70; B09B 3/00

[52] U.S. Cl. .................................... 252/188.1; 252/187.1; 252/188.5; 210/702; 210/710; 210/757; 588/901

[58] Field of Search ............................. 252/186.1, 187.1, 252/188.1, 188.25; 588/901; 210/702, 710, 757

[56] References Cited

FOREIGN PATENT DOCUMENTS

| | | |
|---|---|---|
| 53-84923 | 7/1978 | Japan . |
| 55-2412 | 1/1980 | Japan . |
| 5-32676 | 2/1993 | Japan . |
| 5-269476 | 10/1993 | Japan . |
| 7-308682 | 11/1995 | Japan . |
| 8-257570 | 10/1996 | Japan . |

*Primary Examiner*—Shean C. Wu
*Attorney, Agent, or Firm*—Sughrue, Mion, Zinn, Macpeak & Seas, PLLC

[57] ABSTRACT

According to the present invention, there is provided a method for nonbiologically treating an chlorinated organic compound contained in an environment polluted with the chlorinated organic compound, which comprises the step of introducing silicon into the environment to dechlorinate the chlorinated organic compound.

12 Claims, 7 Drawing Sheets

CARBON TETRACHLORIDE CONCENTRATION (volppm)
300
200
100
0
2
4
6
8
10
TIME (DAY)
20
10
0
AMOUNT OF GENERATED HYDROGEN (ml)
6
4
2
0
INCREASE OF CHLORINE ION CONCENTRATION (mg/l)

▲ HYDROGEN

■ CHLORINE ION

○ CARBON TETRACHLORIDE CONCENTRATION OF COMPARATIVE EXAMPLE 1

● CARBON TETRACHLORIDE CONCENTRATION OF EXAMPLE 1

▲ HYDROGEN

○ CARBON TETRACHLORIDE CONCENTRATION OF COMPARATIVE EXAMPLE 3

● CARBON TETRACHLORIDE CONCENTRATION OF EXAMPLE 3

▲ HYDROGEN

○ TETRACHLOROETHYLENE CONCENTRATION OF COMPARATIVE EXAMPLE 4

● TETRACHLOROETHYLENE CONCENTRATION OF EXAMPLE 4 (NO. 1)

METHOD FOR TREATING CHLORINATED ORGANIC COMPOUND

BACKGROUND OF THE INVENTION

1. Field of the Invention

The present invention relates to a method for treating an chlorinated organic compound present in a polluted environment, particularly a soil or a ground water by dechlorination.

2. Description of the Related Art

Heretofore, as treatment methods of chlorinated organic compounds, various physical/chemical and biological methods have been used. In the case that a ground water is polluted with the chlorinated organic compound, a method is usually utilized in which the polluted water is pumped and then aerated to remove the chlorinated organic compound from the ground water. Furthermore, as another treatment technique of the water containing the chlorinated organic compound, there is a method in which the chlorinated organic compound is decomposed by the irradiation of ultraviolet light. In the case of the pollution at an extremely low concentration, a method can be utilized which comprises dissolving hydrogen in the polluted water, and then bringing it into contact with the surface of a metal to carry out dechlorination (Japanese Patent Publication No. 2412/1980). On the other hand, for the treatment of the chlorinated organic compound present in water in a soil or among soil masses, there can be used a vacuum extraction method which comprises a suction step by the utilization of reduced pressure, an on-site or an off-site burning method which comprises digging out a polluted soil, and then subjecting it to a burning treatment, a heat desorption method which comprises releasing the chlorinated organic compound from the soil by heating, and a soil cleaning method which comprises oozing out the chlorinated organic compound by the use of water or another solvent. In addition, as a purification method for a low-concentration pollution in a wide range, a bioremediation method utilizing microorganisms has also been investigated.

However, the above treatment methods all have the following problems regarding treatment efficiency, cost, easiness and the like.

Firstly, of the above treatment methods, the physical/chemical treatment method requires facilities and apparatus for separating the chlorinated organic compound from the environment and then treating it, and for the installation of the facilities, their operation and maintenance, a great deal of cost is required. On the other hand, in the bioremediation method in which a biological treatment is done, it is necessary to properly control a temperature, a pH, the concentrations of nutrient salts and dissolved oxygen, and the like for the purpose of keeping up the activity of micro-organisms for the treatment, and hence an apparatus for continuously adding oxygen and the nutrient salts to the environment is required.

SUMMARY OF THE INVENTION

According to the present invention, there is provided a method for nonbiologically treating an chlorinated organic compound contained in an environment polluted with the chlorinated organic compound, which comprises the step of introducing silicon into the environment to dechlorinate the chlorinated organic compound.

Silicon is mixed with the area contaminating chlorinated organic compound to generate hydrogen. Examples of substances for accelerating the generation of hydrogen from silicon include basic substances, alkali metal salts and alkaline earth metal salts, and if necessary, any of these substances can be added together with silicon to the environment. In addition, a transition metal powder can be added thereto, whereby the dechlorination can further be accelerated. The dechlorination of the chlorinated organic compound begins simultaneously with the generation of hydrogen from silicon, and when the generation of hydrogen from silicon ends, the progress of the dechlorination also stops.

Even when the basic substance is added together with silicon, it is not necessary to adjust a pH after the treatment, because in a high pH range, silicon is dissolved to become silicic acid which has a neutralization function. Moreover, in the case that it is required to maintain the pH of the environment in a neutral range, the addition of the alkali metal salt or the alkaline earth metal salt is preferred in place to the basic substance.

When dissolved or oxidized, silicon becomes silicon oxide. Silicon and silicon oxide are safe, even when reside and accumulate in a soil.

As described above, the treatment method of the chlorinated organic compound according to the present invention comprises adding silicon to the environment polluted with the chlorinated organic compound, and mixing them, and therefore large-scale treatment apparatus and facilities are unnecessary, and a good deal of energy is not necessary, either. Moreover, it is also unnecessary to take care of conditions of oxygen required for the biological treatment and the like. In addition, as silicon for use in the present invention, there can be utilized a silicon sludge discharged from a semiconductor manufacturing process, a silicon wafer manufacturing process or the like. Therefore, the treatment method of the chlorinated organic compound according to the present invention can be accomplished simply and at a low cost. Moreover, in contrast to the biological purification method, the treatment method of the present invention does not depend on the presence of oxygen, and a pH range in which the purification is possible is extensive. In consequence, the treatment method of the present invention is applicable in a wide range.

DETAILED DESCRIPTION OF THE PREFERRED EMBODIMENTS

Figure 1:
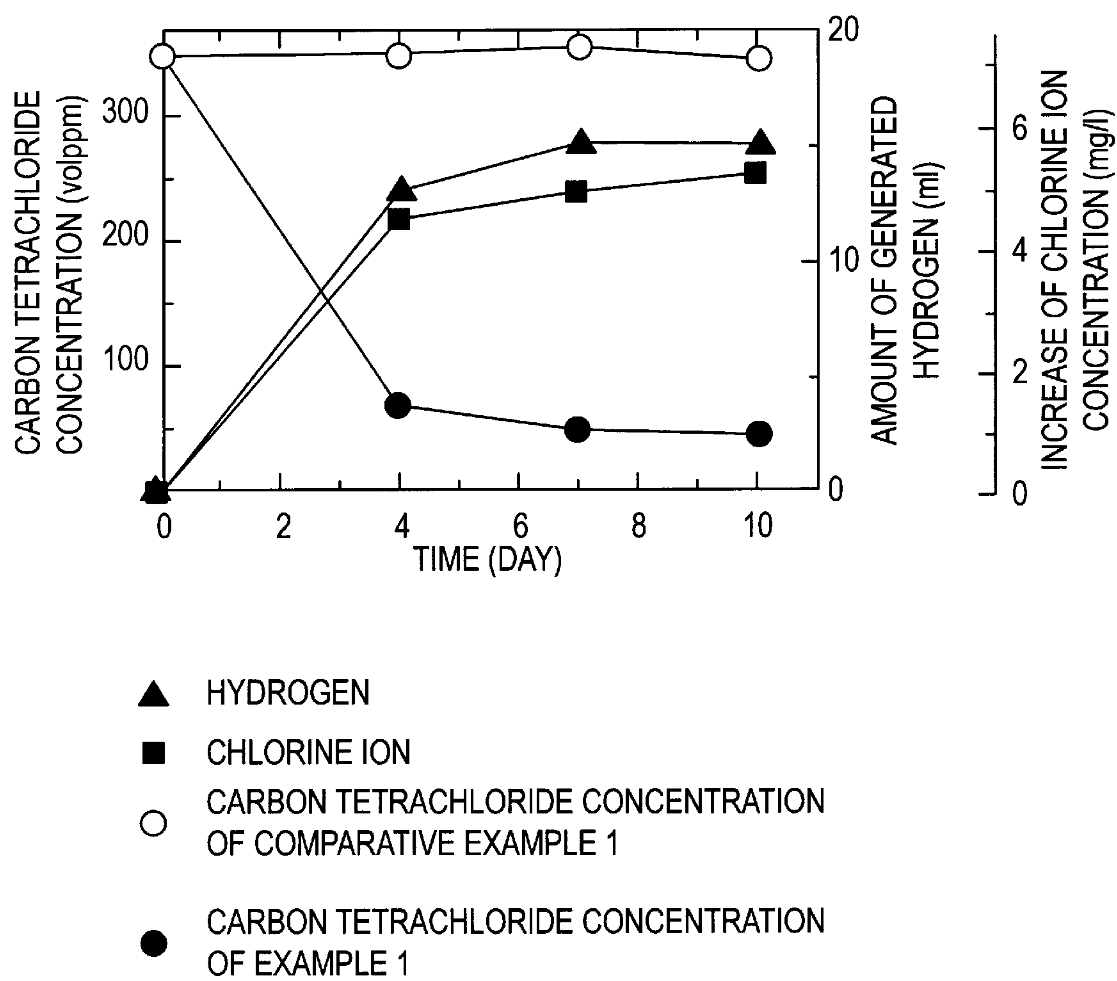
FIG. 1 shows a dechlorination state of carbon tetrachloride by silicon.

A treatment method of an chlorinated organic compound according to the present invention is a nonbiological treatment method in which a degradation function by microorganisms is not utilized. Therefore, the treatment method of the present invention can be applied to an environment in which no microorganisms are present, an environment in which the degradation function by the microorganisms scarcely occurs, and an environment which is not under anaerobic conditions. In addition, the reaction of the present invention is not disturbed, even if the microorganisms are present. Accordingly, by the utilization of hydrogen generated from silicon, the dechlorination by the microorganisms can be carried out together with the nonbiological treatment method of the present invention. Furthermore, the separation of the chlorinated organic compound from the environment can be promoted by an aeration effect of the generated hydrogen gas.

Examples of the chlorinated organic compound in the present invention include carbon tetrachloride, chloroform, tetrachloroethylene, trichloroethylene and cis-1,2-dichloroethylene.

In the present invention, silicon is used to generate hydrogen. Various types of silicon can be utilized, but granular silicon is preferable in consideration of reactivity. In the case of particulate silicon, for example, silicon particles having a size of 0.01 to 10 μm can be utilized. If a silicon sludge discharged from a semiconductor manufacturing process, a silicon wafer manufacturing process or the like is utilized as granular silicon, the cost can further be decreased.

In the case that hydrogen is generated by the use of silicon, it is necessary to bring silicon into contact with water. When a water content in a polluted soil which is to be cleaned up is insufficient, water can further be mixed with silicon, or calcium carbonate or calcium chloride having hydroscopicity can be mixed with silicon to supplement water. Here, examples of basic substances which can be used in the present invention include sodium hydroxide, sodium carbonate, potassium hydroxide, calcium hydroxide and calcium oxide, and they can be used singly or in a combination of two or more thereof. Moreover, also by the use of a basic substance other than mentioned above, the generation of hydrogen is possible, and the present invention should not be limited to the above examples.

Examples of an alkali metal salt which can be used in the present invention include salts of lithium, sodium and potassium. In practice, sodium chloride, potassium chloride and sodium hydrogencarbonate which have a less influence on the environment are preferable, but also by the use of an alkali metal salt other than mentioned above, the generation of hydrogen from silicon is possible, and the present invention should not be limited to the above examples.

Examples of an alkaline earth metal salt which can be used in the present invention include magnesium salts and calcium salts. In practice, calcium carbonate and magnesium carbonate which have a less influence on the environment are preferable, but also by the use of an alkaline earth metal salt other than mentioned above, the generation of hydrogen from silicon is possible, and the present invention should not be limited to the above examples.

Examples of a transition metal which can be used in the present invention include platinum, titanium and iron, but preferable is iron which is relatively less poisonous and inexpensive.

Mixing the polluted material with silicon in the present invention can be achieved, for example, in the case of a polluted ground water, by burying a feed pipe having a feed orifice at an optional position so that the feed orifice may be positioned in the range of a soil to be cleaned up, and then applying a feed pressure by means of a pump or the like. Alternatively, for example, in the case of a polluted soil, this polluted soil can be mixed with silicon by plowing the soil. The present invention should not be limited at all by the mixing method of the polluted material and silicon.

EXAMPLE 1 AND COMPARATIVE EXAMPLE 1

In a 120 ml vial was placed 10 ml of tap water, and 0.2 μl of carbon tetrachloride was then added thereto by a microsyringe. Next, 0.1 g of silicon particles (an average particle diameter=0.8 μm) was added to the vial containing carbon tetrachloride, and the vial was stopped with a rubber plug coated with a Teflon laminate and further sealed with an aluminum cap to prepare a sample of Example 1. As another sample for Comparative Example 1, a sample of a vial was used to which tap water and carbon tetrachloride alone were added. As the silicon particles, there were used the silicon particles separated and dried, by high-speed centrifugal deposition, from a silicon wafer back surface polishing waste liquor discharged from a semiconductor manufacturing process. Prior to the use of the vial and the silicon particles in the experiments, they were dried and sterilized at 175° C. for 20 minutes, and carbon tetrachloride and tap water were filtered and sterilized (0.2 μm). Until the sealing of the vial, the operation of preparing the sample was carried out in a clean bench to eliminate the influence of microorganisms. This sample was allowed to stand at a constant temperature of 30° C. The gas present in the head space of the vial was sampled by the sterilized syringe, and a concentration of carbon tetrachloride in a gaseous phase was determined by a gas chromatography having FID as a detector. Furthermore, a chlorine ion concentration in the aqueous solution was determined by sampling a water layer portion and then using an ion chromatography. An amount of generated hydrogen was calculated on the basis of a pressure measured by a pressure sensor. The obtained results are shown in FIG. 1. With regard to the sample of Example 1 to which the silicon particles were added, the concentration of carbon tetrachloride decreased from 347 volppm to 45 volppm between the start of the experiment and the 10th day after the generation of hydrogen, i.e., the concentration of added carbon tetrachloride lowered to 13% of that at the start of the experiment. On the other hand, with regard to the sample of Comparative Example 1 to which silicon was not added, the decrease of the carbon tetrachloride concentration was not observed. In addition, in the sample of Example 1, the carbon tetrachloride concentration on the 10th day after the start of the experiment increased as much as 5.20 mg/l. This increase was substantially equal to a chlorine ion concentration increased by the dechlorination of one chlorine atom from carbon tetrachloride, and in the vial, the concentration of chloroform in which one chlorine atom of carbon tetrachloride was substituted by a hydrogen atom increased. The increase of the amount of generated hydrogen was coincident with the decrease of the concentration of carbon tetrachloride, and the increase of generated hydrogen was also coincident with the increase tendency of the chlorine ion concentration in the aqueous solution. Therefore, it was apparent that the dechlorination reaction of carbon tetrachloride proceeded with the generation of hydrogen from silicon. Moreover, since the experimental system was all beforehand sterilized, the dechlorination reaction could be understood to be nonbiological. Incidentally, also in an experimental example in which the gaseous phase of the sample in Example 1 was purged with nitrogen, the same dechlorination as described above was accomplished, and from this fact, it was confirmed that the presence of oxygen had no influence on the dechlorination method of the present invention.

EXAMPLE 2 AND COMPARATIVE EXAMPLE 2

Figure 2:
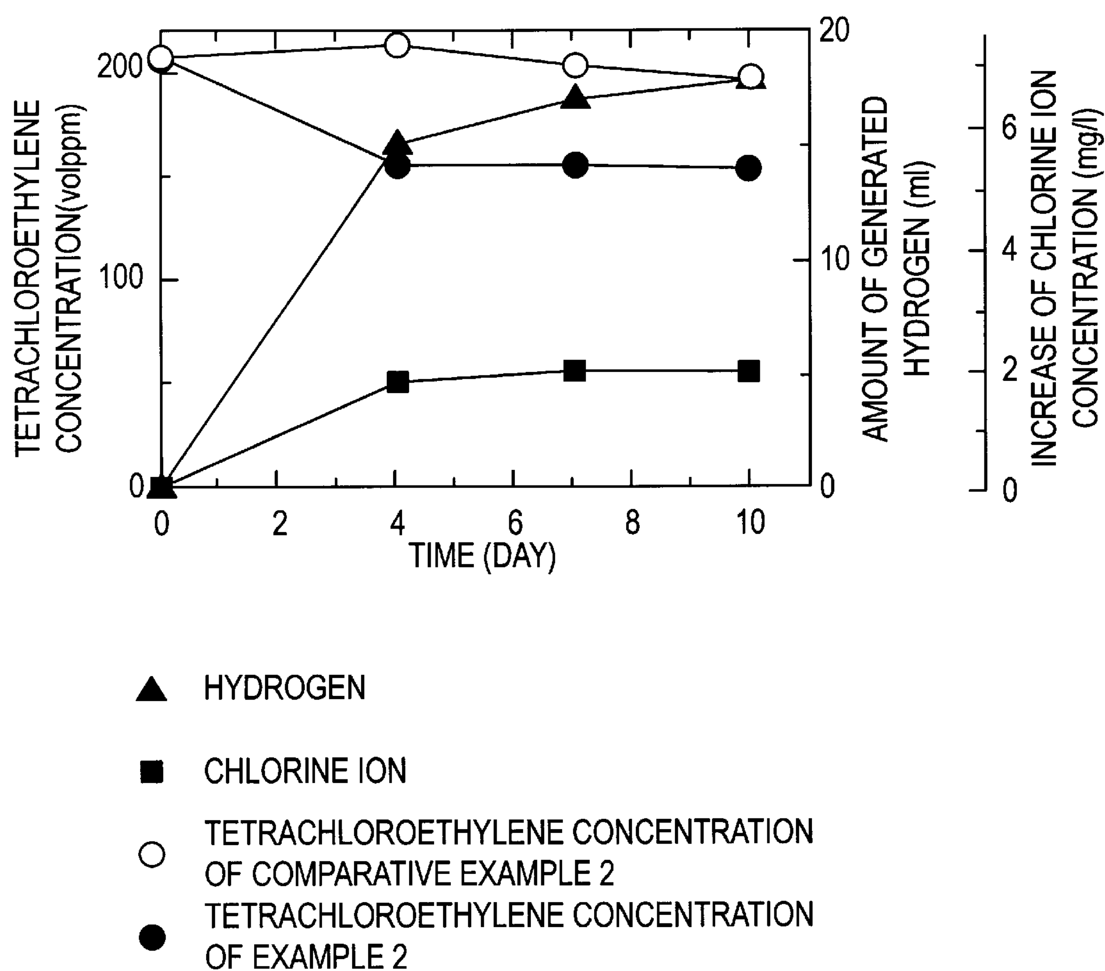
FIG. 2 shows a dechlorination state of tetrachloroethylene by silicon.
Figure 3:
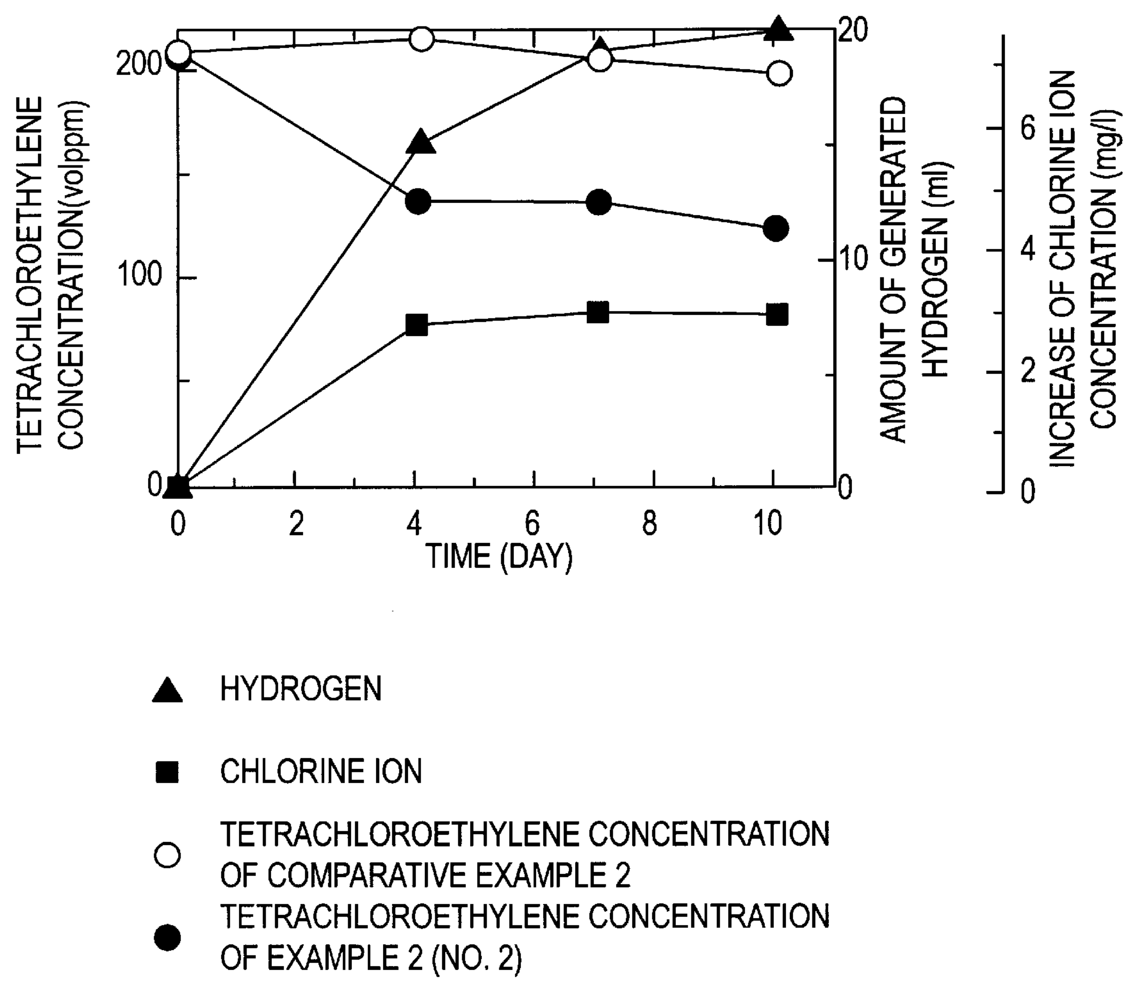
FIG. 3 shows a dechlorination state of tetrachloroethylene by silicon and an iron powder.

In a 120 ml vial was placed 10 ml of tap water, and 0.2 μl of tetrachloroethylene was then added thereto by a microsyringe. Next, (1) 0.1 g of silicon particles was added thereto, thereby preparing a sample of Example 2 (No. 1), (2) 0.1 g of silicon particles and 0.1 g of an iron powder were added thereto, thereby preparing a sample of Example 2 (No. 2), and (3) no additive was added thereto, thereby preparing a sample of Comparative Example 2. Each vial was stopped with a rubber plug coated with a Teflon laminate and further sealed with an aluminum cap, and each sample was allowed to stand in a thermostatic chamber at 30° C. As the silicon particles, there were used the silicon particles separated and dried, by high-speed centrifugal deposition, from a silicon wafer back surface polishing waste liquor discharged from a semiconductor manufacturing process. Prior to the use of the vial, the silicon particles and the iron powder in the experiments, they were dried and sterilized at 175° C. for 20 minutes, and tetrachloroethylene and tap water were filtered and sterilized (0.2 μm) to eliminate the influence of microorganisms on the dechlorination reaction of tetrachloroethylene. The gas present in the head space of the vial was sampled by the sterilized syringe, and a concentration of tetrachloroethylene in a gaseous phase was determined by a gas chromatography having FID as a detector. Furthermore, the liquid phase in the vial was sampled by the sterilized syringe, and a chlorine ion concentration in the aqueous solution was determined through an ion chromatography. An amount of generated hydrogen was calculated on the basis of a pressure measured by a pressure sensor. The results of No. 1 of Example 2 are shown in FIG. 2, and the results of No. 2 of Example 2 are shown in FIG. 3. With regard to the sample of No. 1 to which the silicon particles were added, the concentration of tetrachloroethylene decreased from 206 volppm at the start of the experiment to 155 volppm at the 10th day after the experiment, i.e., the concentration of tetrachloroethylene lowered to 75% of that at the start of the experiment. On the other hand, with regard to the sample of No. 2, the concentration of tetrachloroethylene decreased from 209 volppm to 121 volppm, i.e., the concentration of tetrachloroethylene lowered to 58% of that at the start of the experiment. In the sample of Comparative Example 2, 95% of the tetrachloroethylene concentration at the start of the experiment remained at the 10th day. It was apparent that the dechlorination of tetrachloroethylene was promoted by adding silicon, and the effect of the dechlorination promotion was further increased by adding the iron powder. In Example 2, the increase of the amount of generated hydrogen was coincident with the increase tendency of the chlorine ion concentration in the aqueous solution, and the concentration of tetrachloroethylene decreased with the generation of hydrogen, and from this fact, it was definite that this reaction was the dechlorination reaction of tetrachloroethylene by the generation of hydrogen from silicon. Moreover, since the experimental system was all beforehand sterilized, the dechlorination reaction could be understood to be nonbiological.

EXAMPLE 3 AND COMPARATIVE EXAMPLE 3

Figure 4:
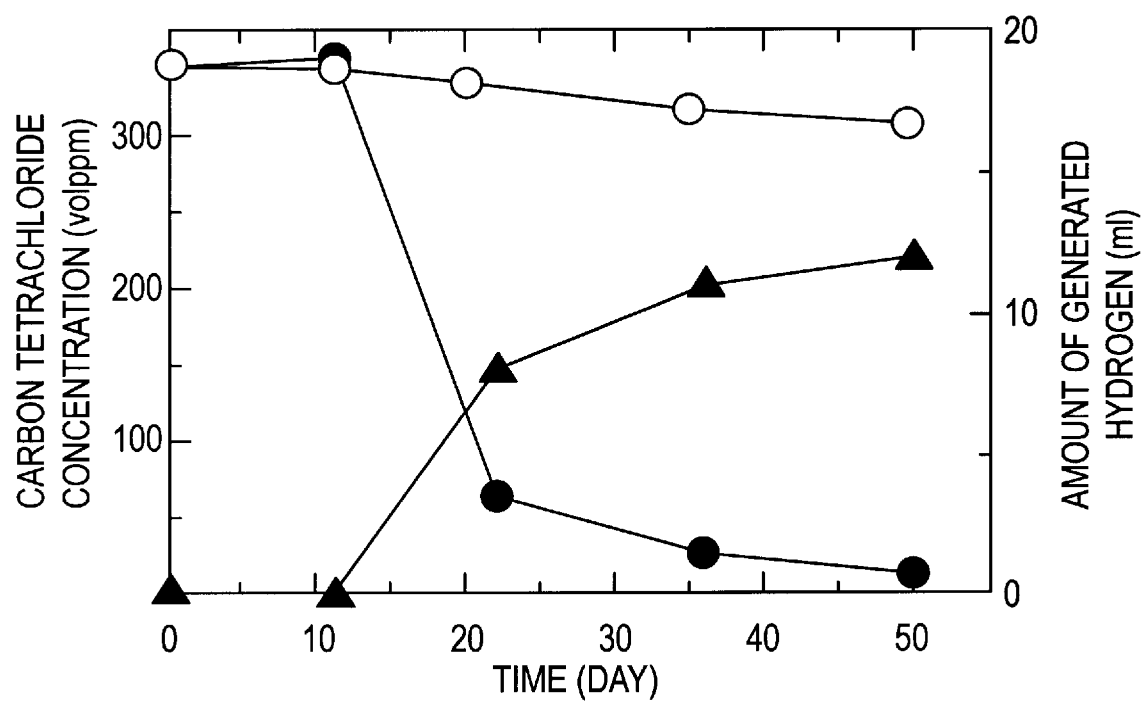
FIG. 4 shows a dechlorination state of carbon tetrachloride by silicon.

In a 70 ml vial was placed 50 g of a soil, 25 ml of tap water and 1 μl of carbon tetrachloride to prepare a sample of Comparative Example 3. On the other hand, 0.1 g of silicon particles (an average particle diameter=0.8 μm) was further added thereto, thereby preparing a sample of Example 3. As the silicon particles, there were used the silicon particles separated and dried, by high-speed centrifugal deposition, from a silicon wafer back surface polishing waste liquor discharged from a semiconductor manufacturing process. Prior to the use of the vial and the silicon particles in the experiments, they were dried and sterilized at 175° C. for 20 minutes, and carbon tetrachloride and tap water were filtered and sterilized (0.2 μm) to eliminate the influence of microorganisms on the dechlorination reaction of carbon tetrachloride. The reaction was carried out at 25° C. The gas present in the head space of the vial was sampled by the sterilized syringe, and a concentration of carbon tetrachloride in a gaseous phase was determined by a gas chromatography having FID as a detector. An amount of generated hydrogen was calculated on the basis of a pressure measured by a pressure sensor. The obtained results are shown in FIG. 4. With regard to the sample of Example 3 to which the silicon particles were added, the concentration of carbon tetrachloride decreased from 345 volppm at the start of the experiment to 17 volppm on the 50th day, i.e., the concentration of carbon tetrachloride lowered to 5% of that before the hydrogen generation. On the other hand, in the sample of Comparative Example 3, carbon tetrachloride remained in a ratio of 90% of the amount at the start of the experiment. The decrease of the carbon tetrachloride concentration was coincident with the time of the hydrogen generation. As described above, by adding silicon to carbon tetrachloride in the soil column, the chemical dechlorination of carbon tetrachloride with the hydrogen generation could be promoted.

EXAMPLE 4 AND COMPARATIVE EXAMPLE 4

Figure 5:
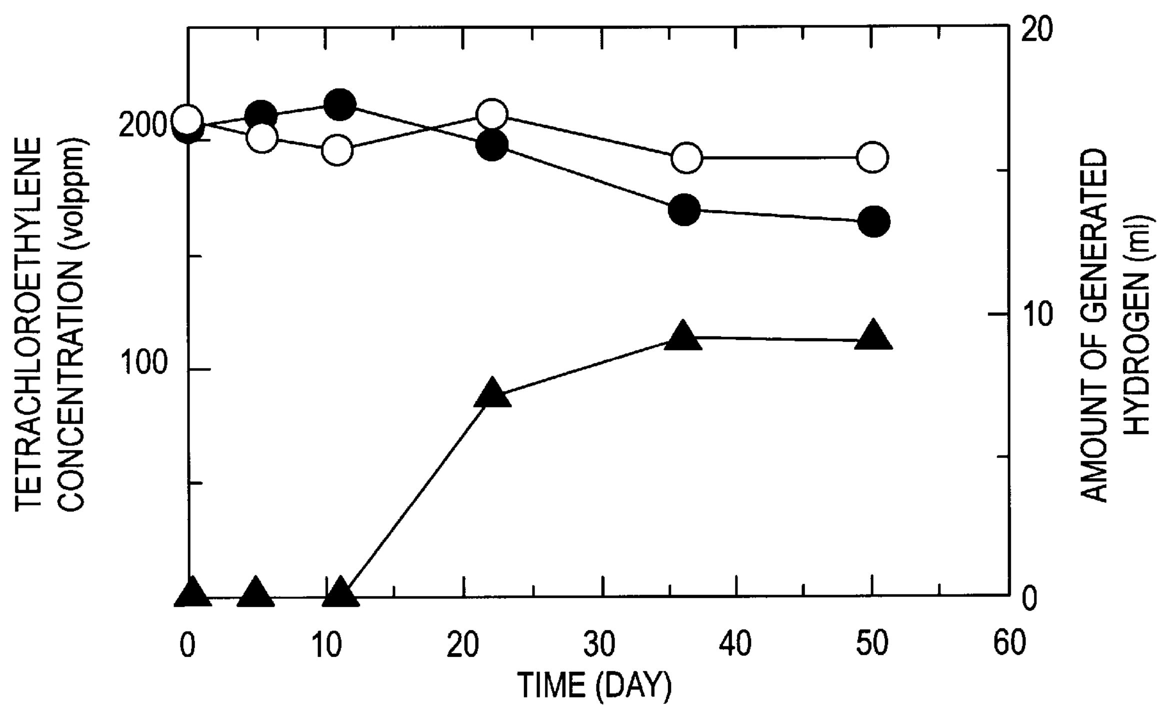
FIG. 5 shows a dechlorination state of tetrachloroethylene by silicon.
Figure 6:
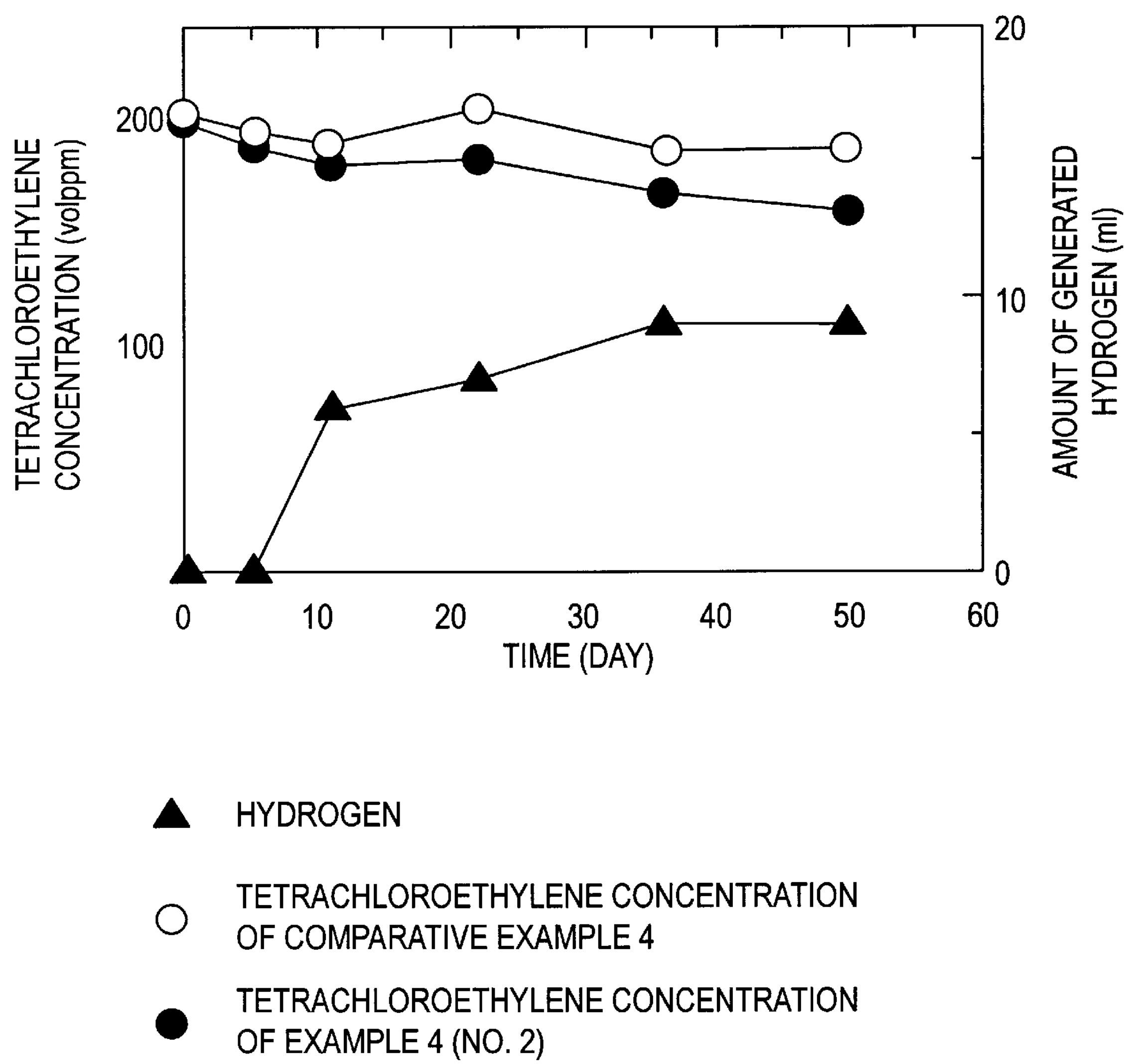
FIG. 6 shows a dechlorination state of tetrachloroethylene by silicon and sodium carbonate.
Figure 7:
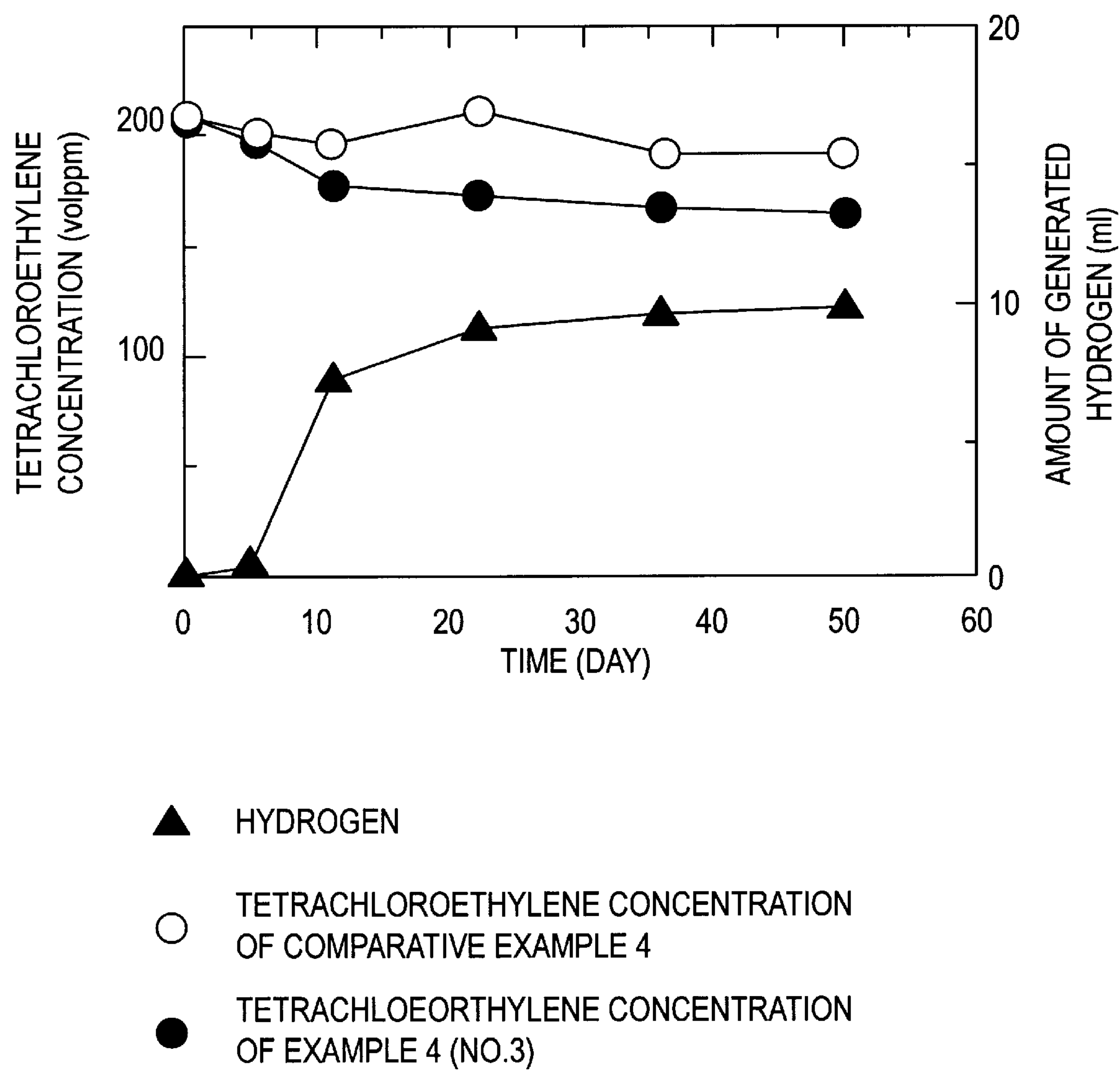
FIG. 7 shows a dechlorination state of tetrachloroethylene by silicon and calcium chloride.

In a 70 ml vial was placed 50 g of a soil, 25 ml of tap water and 1 μl of tetrachloroethylene to prepare a sample of Comparative Example 4. Next, (1) 0.1 g of silicon particles (an average particle diameter=0.8 μm) was added thereto, thereby preparing a sample of Example 4 (No. 1), (2) 0.1 g of silicon particles (an average particle diameter=0.8 μm) and 0.01 g of sodium carbonate were added thereto, thereby preparing a sample of Example 4 (No. 2), and (3) 0.1 g of silicon particles (an average particle diameter=0.8 μm) and 0.01 g of calcium chloride were added thereto, thereby preparing a sample of Example 4 (No. 3). As the silicon particles, there were used the silicon particles separated and dried, by high-speed centrifugal deposition, from a silicon wafer back surface polishing waste liquor discharged from a semiconductor manufacturing process. Prior to the use of the vial and the silicon particles in the experiments, they were dried and sterilized at 175° C. for 20 minutes, and tetrachloroethylene and tap water were filtered and sterilized (0.2 μm) to eliminate the influence of microorganisms on the dechlorination reaction of tetrachloroethylene. The reaction was carried out at 25° C. The gas present in the head space of the vial was sampled by the sterilized syringe, and a concentration of tetrachloroethylene in the vial was determined. An amount of generated hydrogen was calculated on the basis of a pressure measured by a pressure sensor. The results of Example 4 (No. 1) are shown in FIG. 5, the results of Example 4 (No. 2) are shown in FIG. 6, and the results of Example 4 (No. 3) are shown in FIG. 7. The tetrachloroethylene concentration on the 50th day after the start of the experiment was 168 volppm in the case of No. 1, 165 volppm in the case of No. 2 and 166 volppm in the case of No. 3, though it was 210 volppm at the start of the experiment. Thus, the concentration of tetrachloroethylene lowered to 80% of that at the start of the experiment. On the other hand, in the sample of Comparative Example 4, 93% of the tetrachloroethylene concentration at the start of the experiment remained. A time when the decrease of the tetrachloroethylene concentration in Sample Nos. 1 to 3 begun was coincident with a time when the hydrogen generation begun. Moreover, this time of No. 2 (to which sodium carbonate was added) and No. 3 (to which calcium chloride was added) was earlier than that of No. 1. As described above, by adding silicon to the aqueous solution of tetrachloroethylene which was an chlorinated organic compound, the nonbiological dechlorination of tetrachloroethylene could be promoted. In addition, by adding sodium carbonate or calcium chloride, the dechlorination of the chlorinated organic compound could be promoted. Magnesium chloride was also used in place of calcium chloride, and in the case of magnesium chloride, the hydrogen generation was earlier than when magnesium chloride was used, but the decrease of the tetrachloroethylene concentration occurred simultaneously. A degree of the tetrachloroethylene concentration decrease was substantially equal.

What is claimed is:

1. A method for nonbiologically treating a chlorinated organic compound contained in an environment polluted with the chlorinated organic compound, which comprises the step of introducing silicon into the environment to dechlorinate the chlorinated organic compound.

2. The method for treating a chlorinated organic compound according to claim 1 wherein the morphology of silicon is finely particulate.

3. The method for treating a chlorinated organic compound according to claim 1 wherein silicon is suspended in an aqueous medium, and then introduced into the environment.

4. The method for treating a chlorinated organic compound according to claim 1 wherein a basic substance is introduced together with silicon into the environment.

5. The method for treating a chlorinated organic compound according to claim 1 wherein an alkali metal salt is introduced together with silicon into the environment.

6. The method for treating a chlorinated organic compound according to claim 1 wherein an alkaline earth metal salt is introduced together with silicon into the environment.

7. The method for treating a chlorinated organic compound according to claim 1 wherein a transition metal powder is introduced together with silicon into the environment.

8. The method for treating a chlorinated organic compound according to claim 7 wherein the transition metal powder contains iron.

9. The method for treating a chlorinated organic compound according to claim 1 wherein the chlorinated organic compound is carbon tetrachloride or tetrachloroethylene.

10. The method for treating a chlorinated organic compound according to claim 1 wherein the environment is water.

11. The method for treating a chlorinated organic compound according to claim 1 wherein the environment is a soil.

12. The method for treating a chlorinated organic compound according to claim 4, wherein the basic substance comprises at least one substance selected from the group consisting of sodium hydroxide, sodium carbonate, potassium hydroxide, calcium hydroxide and calcium oxide.

* * * * *